United States Patent [19]

Fonnesbeck et al.

[11] Patent Number: 5,303,260
[45] Date of Patent: Apr. 12, 1994

[54] METHOD AND CIRCUIT FOR COMPENSATING FOR OSCILLATOR DRIFT IN A SPREAD-SPECTRUM COMMUNICATION SYSTEM

[75] Inventors: Dale D. Fonnesbeck, Kaysville; Vaughn L. Mower, Bountiful, both of Utah

[73] Assignee: Unisys Corporation, Blue Bell, Pa.

[21] Appl. No.: 1,356

[22] Filed: Jan. 6, 1993

[51] Int. Cl.$^5$ .............................................. H04L 9/00
[52] U.S. Cl. ........................................ 375/1; 380/46; 380/48
[58] Field of Search .................. 380/46, 48; 375/1

[56] References Cited

U.S. PATENT DOCUMENTS

| | | | |
|---|---|---|---|
| 5,155,490 | 10/1992 | Spradley et al. | 342/357 |
| 5,177,755 | 1/1993 | Holland et al. | 375/1 |
| 5,177,765 | 1/1993 | Holland et al. | 375/1 |

Primary Examiner—David C. Cain
Attorney, Agent, or Firm—Charles J. Fassbender; Mark T. Starr

[57] ABSTRACT

The present invention applies in a communication system where - a) two vehicles $V_A$ and $V_B$ transmit data to each other intermittently, b) data transmitted from $V_A$ to $V_B$ is modulated in $V_A$ by a PN code $PN_1$ having a time varying phase $\phi_{MA}$ and is correlated in $V_B$ by the code $PN_1$ having a different time varying phase $\phi_{CB}$, and c) data transmitted from $V_B$ to $V_A$ is modulated in $V_B$ by a PN code $PN_2$ having a time varying phase $\phi_{MB}$ and is correlated in $V_A$ by the code $PN_2$ having a different time varying phase $\phi_{CA}$. With the present invention, the codes $PN_1$ and $PN_2$ can have respective nominal frequencies $f_1 = 1/T_1$ and $f_2 = 1/T_2$ that drift in at least one of the vehicles. This drift, is then compensated for by the present invention by sensing, during the data transmissions, the phase shifts $\Delta\phi_{MA}$, $\Delta\phi_{MB}$ and $\Delta\phi_{CB}$ which respectively occur in said PN codes over a time interval $\Delta T_X$; calculating a drift rate DR from the sensed phase shifts; measuring a time interval $\Delta T_Y$ during which data transmission between $V_A$ and $V_B$ are stopped; and thereafter, compensating for drift before re-establishing data transmissions by phase shifting, in one of the vehicles, code $PN_1$ by an amount proportional to (DR) ($\Delta T_Y$).

11 Claims, 6 Drawing Sheets

FIG.5 eq.1 — FROM CASES #9-#12 — DRIFT = $\dfrac{\Delta\phi_{CB} + \Delta\phi_{CA}}{2}$ eq.2 — FROM CASES #5-#8 — $\Delta\phi_{CB} - \Delta\phi_{CA} = 0$ IF SHIFT IS DUE TO A/B MOVEMENT ∴ eq.1 IS OK eq.3 — FROM CASES #3-#4 — NEED TO ADD $\Delta\phi_{CB} + \Delta\phi_{MB}$ eq.4 — DRIFT = $\dfrac{(\Delta\phi_{CB} + \Delta\phi_{MB}) - \Delta\phi_{CA}}{2}$ eq.5 — FROM CASES #1-#2 — NEED TO ADD $\Delta\phi_{CA} + \Delta\phi_{MA}$ eq.5 — DRIFT = $\dfrac{(\Delta\phi_{CB} + \Delta\phi_{MB}) - (\Delta\phi_{CA} + \Delta\phi_{MA})}{2}$

FIG.6

| | | | | | | |
|---|---|---|---|---|---|---|
| L1 | INITIAL STATE AT t0 | $\phi_{MA}$ | +300 | | $\phi_{CB}$ | +200 |
| | | $\phi_{CA}$ | +500 | | $\phi_{MB}$ | +600 |
| L2 | A MOVES AWAY 50 BITS PER CASE #1 | $\phi_{MA}$ | +350 | | $\phi_{CB}$ | |
| | | $\phi_{CA}$ | +450 | | $\phi_{MB}$ | |
| L3 | B MOVES AWAY 20 BITS PER CASE #7 | $\phi_{MA}$ | | | $\phi_{CB}$ | +180 |
| | | $\phi_{CA}$ | +430 | | $\phi_{MB}$ | |
| L4 | A MOVES CLOSER 60 BITS PER CASE #6 | $\phi_{MA}$ | | | $\phi_{CB}$ | +240 |
| | | $\phi_{CA}$ | +490 | | $\phi_{MB}$ | |
| L5 | B MOVES CLOSER 10 BITS PER CASE #4 | $\phi_{MA}$ | | | $\phi_{CB}$ | +250 |
| | | $\phi_{CA}$ | | | $\phi_{MB}$ | +590 |
| L6 | A OSC DRIFTS FAST 30 BITS PER CASE #9 | $\phi_{MA}$ | | | $\phi_{CB}$ | +280 |
| | | $\phi_{CA}$ | +460 | | $\phi_{MB}$ | |
| L7 | B OSC DRIFTS SLOW 15 BITS PER CASE #12 | $\phi_{MA}$ | | | $\phi_{CB}$ | +295 |
| | | $\phi_{CA}$ | +445 | | $\phi_{MB}$ | |

FIG.7 eq.10 ~ $\text{DRIFT} = \dfrac{(\Delta\phi_{MB} + \Delta\phi_{CB}) - (\Delta\phi_{MA} + \Delta\phi_{CA})}{2}$ eq.11 ~ $\text{DRIFT} = \dfrac{(590-600) + (295-200) - [(350-300) + (445-500)]}{2}$ eq.12 ~ $\text{DRIFT} = \dfrac{-10 + 95 - [50 + (-55)]}{2}$ eq.13 ~ $\text{DRIFT} = +45$

FIG. 8 eq. 20 ~ $DR = \dfrac{(\Delta\phi_{MB} + \Delta\phi_{CB}) - (\Delta\phi_{MA} + \Delta\phi_{CA})}{2\Delta T_x}$ eq. 21 ~ STOP TRANSMISSIONS FOR $\Delta T_Y$ eq. 22 ~ CORRECTION $\Delta\phi_{MA} = -(DR)(\Delta T_Y)$ CORRECTION $\Delta\phi_{CA} = -(DR)(\Delta T_Y)$ eq. 23 ~ CORRECTION $\Delta\phi_{MA} = I\left\{-(DR)(\Delta T_Y)\right\} = S\phi_{MA2}$ CORRECTION $\Delta\phi_{MA} = I\left\{-(DR)(\Delta T_Y)\right\} = S\phi_{MA2}$

FIG. 9 eq. 30 ~ $DR = \dfrac{(\Delta\phi_{MB} + \Delta\phi_{CB}) - (\Delta\phi_{MA} + \Delta\phi_{CA})}{2\Delta T_x}$ eq. 31 ~ SUBSTITUTE $\Delta\phi_{MB} \rightarrow \Delta\phi_{MB}T_2$ $\Delta\phi_{CB} \rightarrow \Delta\phi_{CB}T_1$ $\Delta\phi_{MA} \rightarrow \Delta\phi_{MA}T_1$ $\Delta\phi_{CA} \rightarrow \Delta\phi_{CA}T_2$ eq. 32 ~ $DR = \dfrac{(\Delta\phi_{MB}T_2 + \Delta\phi_{CB}T_1) - (\Delta\phi_{MA}T_1 + \Delta\phi_{CA}T_2)}{2\Delta T_x}$ eq. 33 ~ CORRECTION $\Delta\phi_{MA} = I\left\{\dfrac{-(DR_2)\Delta T_Y}{T_1}\right\} = S\phi_{MA2}$ CORRECTION $\Delta\phi_{CA} = I\left\{\dfrac{-(DR_2)\Delta T_Y}{T_2}\right\} = S\phi_{CA2}$

FIG. 10

METHOD AND CIRCUIT FOR COMPENSATING FOR OSCILLATOR DRIFT IN A SPREAD-SPECTRUM COMMUNICATION SYSTEM

BACKGROUND OF THE INVENTION

This invention relates to communication systems in which data is transmitted between two vehicles via spread spectrum radio signals; and more particularly, it relates to methods and circuits in such communication systems that compensate for drift in the frequency of the PN codes within the spread spectrum signals.

When data is transmitted via spread spectrum radio signals, the data in the transmitting vehicle is modulated by a pseudo-random code called a PN code. Then, in the receiving vehicle, the modulated data is multiplied by the PN code in order to recover the original data.

For the above modulation - demodulation process to work properly, the frequency and phase of the PN code in the receiving vehicle must be precisely matched to the frequency and phase of the code in the incoming modulated data. However, for various reasons (which are explained in the detailed description) the frequency and phase of the PN code in the transmitting vehicle changes with time. Consequently, the task of generating a PN code in the receiving vehicle which matches the frequency and phase of the PN code in the received modulated data is made difficult.

Of particular importance with regard to the present invention is the fact that in both the transmitting vehicle and the receiving vehicle, the PN code is generated in part in response to a clock signal from an oscillator. That oscillator has a predetermined nominal frequency; however, the actual frequency of the clock signal will deviate somewhat from the nominal frequency. In turn, this frequency deviation, herein called drift, will result in a mismatch between the PN code generated in the receiving vehicle and the PN code in the received data.

To minimize drift in the prior art, highly accurate atomic oscillators were used instead of crystal oscillators. Two examples of typical atomic oscillators are a Rubidium oscillator and a Caesium beam oscillator. However, the atomic oscillators in comparison to less accurate crystal oscillators are very expensive. For example, the cost of a M3000 Rubidium oscillator from EFRATOM Corporation is about $10,000 whereas the cost of an EMXO crystal oscillator from EFRATOM Corporation is about $1000.

Also, atomic oscillators in comparison to crystal oscillators occupy more space, weigh more, and consume more power. For example, the above Rubidion oscillator is 3.25"×3.25"×4.5", weighs 2.7 LBS, and consumes 15 watts; whereas the above crystal oscillator is 1.3"×1.3"×1.3", weighs less than 0.1 LBS, and consumes 0.45 watts.

Accordingly, a primary object of the invention is to provide a spread spectrum communication system in which PN codes are generated in response to a relatively inaccurate clock signal from a crystal oscillator, and in which a novel method/circuit is used to compensate for drift in the crystal generated clock signal.

BRIEF SUMMARY OF THE INVENTION

The present invention applies in a communication system where - a) two vehicles $V_A$ and $V_B$ transmit data to each other intermittently, b) data transmitted from $V_A$ to $V_B$ is modulated in $V_A$ by a PN code $PN_1$ having a time varying phase $\phi_{MA}$ and is correlated in $V_B$ by the code $PN_1$ having a different time varying phase $\phi_{CB}$, and c) data transmitted from $V_B$ to $V_A$ is modulated in $V_B$ by a PN code $PN_2$ having a time varying phase $\phi_{MB}$ and is correlated in $V_A$ by the code $PN_2$ having a different time varying phase $\phi_{CA}$. With the present invention, the codes $PN_1$ and $PN_2$ can have respective nominal frequencies $f_1 = 1/T_1$ and $f_2 = 1/T_2$ that drift in at least one of said vehicles. This drift, is then compensated for by the present invention by the steps of:

sensing, during the data transmissions, the phase shifts $\Delta\phi_{MA}$, $\Delta\phi_{CA}$, $\Delta\phi_{MB}$ and $\Delta\phi_{CB}$ which respectively occur in said PN codes over a time interval $\Delta T_X$;

calculating a drift rate DR from the sensed phase shifts where $$DR = \frac{(\Delta\phi_{CB}T_1 + \Delta\phi_{MB}T_2) - (\Delta\phi_{CA}T_2 + \Delta\phi_{MA}T_1)}{2\Delta T_x};$$

measuring a time interval $\Delta T_Y$ during which data transmission between $V_A$ and $V_B$ are stopped; and thereafter, phase shifting, in one of the vehicles, code $PN_1$ by an amount $C_1 \approx -(DR)\Delta T_Y \div T_1$ and code $PN_2$ by an amount $C_2 \approx -(DR)\Delta T_Y \div T_2$.

BRIEF DESCRIPTION OF THE DRAWINGS

A method and circuit which compensate for oscillator drift in a spread spectrum communication system is described herein in conjunction with the accompanying drawings, wherein.

DETAILED DESCRIPTION

Figure 1:
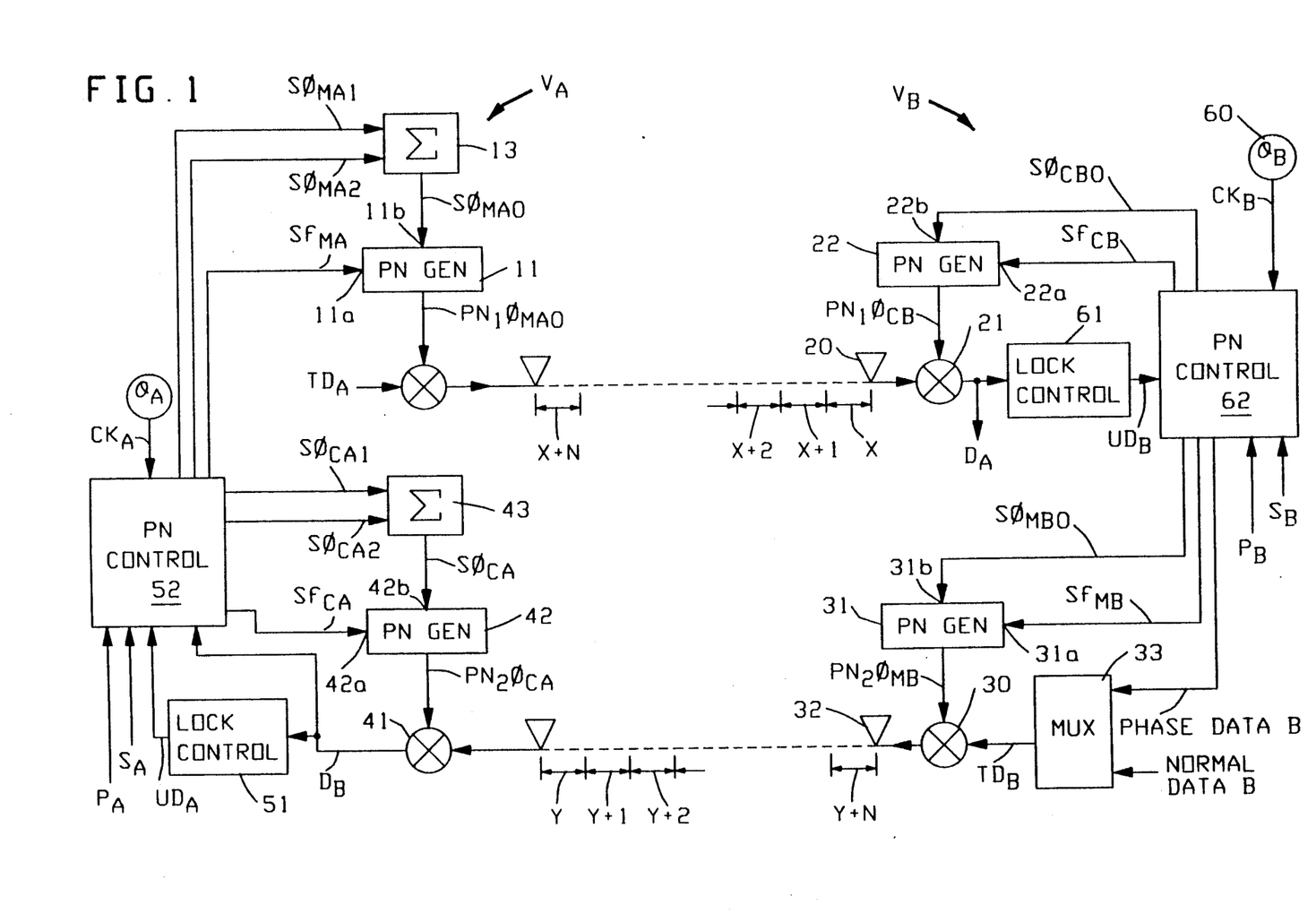
FIG. 1 is a block diagram of a communication system which constitutes one preferred embodiment of the invention.

Referring now to FIG. 1, it shows a block diagram of a communication system which is structured as a preferred embodiment of the present invention. This FIG.

1 communication system is comprised of a vehicle $V_A$ which carries all of the communications circuitry that is shown in the left hand side of FIG. 1, and another vehicle $V_B$ which carries all of the communications circuitry that is shown on the right hand side of FIG. 1. By this circuitry, the two vehicles $V_A$ and $V_B$ transmit data, via spread spectrum radio signals, to each other.

Data transmitted from $V_A$ is indicated in FIG. 1 as $TD_A$, and it is sent to a modulator 10 where it is modulated by a PN code $PN_1\phi_{MA}$. Here, symbol $PN_1$ represents a particular bit sequence which makes up the code, and $\phi_{MA}$ represents the phase of the code. For example, $\phi_{MA}=+1$ indicates the code is advanced relative to some predetermined reference point by one code bit; $\phi_{MA}=-2$ indicates the code is delayed by two code bits; etc.

Code $PN_1\phi_{MA}$ is generated by a PN code generator 11 which has two control inputs 11a and 11b. Input 11a receives a control signal $Sf_{MA}$ which specifies a frequency for the code $PN_1\phi_{MA}$, and input 11b receives a control signal $S\phi_{MA0}$ which specifies incremental phase changes for the code $PN_1\phi_{MA}$. Additional details on how these signals $Sf_{MA}$ and $S\phi_{MA0}$ are generated will be described herein shortly.

From the modulator 10, the modulated data passes to an antenna 12 where it is transmitted to vehicle $V_B$. In FIG. 1, the symbols x, x+1, ... x+N represent respective bits of the code $PN_1$ that were used by the modulator 10 in its modulation process. Then, in vehicle $V_B$, the modulated data is received by an antenna 20 and passed to a correlator 21.

To demodulate the signals from antenna 20, the correlator 21 multiplies those signals by a PN code $PN_1\phi_{CB}$. Here the symbol $PN_1$ indicates the same bit sequence that is used by the modulator 10 of vehicle $V_A$, and the symbol $\phi_{CB}$ indicates the phase of the code to the correlator 21. To properly demodulate the transmitted data, the frequency and phase of code $PN_1\phi_{CB}$ must correspond to the frequency and phase of the code that is received by antenna 20.

Code $PN_1\phi_{CB}$ is generated by a PN code generator 22 which has two control inputs 22a and 22b. Input 22a receives a control signal $Sf_{CB}$ which specifies a frequency of the code $PN_1\phi_{CB}$, and input 22b receives a control signal $S\phi_{CB0}$ which specifies incremental phase changes for the code $PN_1\phi_{CB}$. Additional details on how these signals $Sf_{CB}$ and $S\phi_{CB0}$ are generated will be described herein shortly.

Similarly, data transmitted from $V_B$ to $V_A$ is indicated in FIG. 1 as $TD_B$, and it is sent to a modulator 30 where it is modulated by a PN code $PN_2\phi_{MB}$. Here, symbol $PN_2$ represents a particular bit sequence which makes up the code, and $\phi_{MB}$ represents the phase of the code.

Code $PN_2\phi_{MB}$ is generated by a PN code generator 31 which has two control inputs 31a and 31b. Input 31a receives a control signal $Sf_{MB}$ which specifies a frequency for the code $PN_2\phi_{MB}$, and input 31b receives a control signal $S\phi_{MB0}$ which specifies incremental phase changes for the code $PN_2\phi_{MB}$. Additional details on how these signals $Sf_{MB}$ and $S\phi_{MB0}$ are generated will be described herein shortly.

From the modulator 30, the modulated data passes to an antenna 32 where it is transmitted to vehicle $V_A$. In FIG. 1, the symbols y, y+1, ... y+N represent respective bits of the code $PN_2$ that were used by the modulator 30 in its modulation process. Then, in vehicle $V_A$, the modulated data is received by an antenna 40 and passed to a correlator 41.

To demodulate the signals from antenna 40, the correlator 41 multiplies those signals by a PN code $PN_2\phi_{CA}$. Here the symbol $PN_2$ indicates the same bit sequence that is used by the modulator 30 of vehicle $V_B$, and the symbol $\phi_{CA}$ indicates the phase of the code to the correlator 41. To properly demodulate the transmitted data $TD_B$, the frequency and phase of code $PN_2\phi_{CA}$ must correspond to the frequency and phase of the code that is received by antenna 40.

Code $PN_2\phi_{CA}$ is generated by a PN code generator 42 which has two control inputs 42a and 42b. Input 42a receives a control signal $Sf_{CA}$ which specifies a frequency for the code $PN_2\phi_{CA}$ and input 42b receives a control signal $S\phi_{CA0}$ which specifies incremental phase charges for the code $PN_2\phi_{CA}$.

In vehicle $V_A$, the control signal $S\phi_{MA0}$ is formed by an adder 13 as the sum of two phase other control signals $S\phi_{MA1}$ and $S\phi_{MA2}$. Likewise, the control signal $S\phi_{CA0}$ is formed by an adder 43 as the sum of two control signals $S\phi_{CA1}$ and $S\phi_{CA2}$. Each of these signals specify incremental phase changes for the PN codes. Also, of particular importance in the present invention, are the two control signals $S\phi_{MA2}$ and $S\phi_{CA2}$, since it is those signals which specify phase changes that compensate for drift.

In vehicle $V_A$, the signals $S\phi_{MA1}$, $S\phi_{MA2}$, $S\phi_{CA1}$, $S\phi_{CA2}$, and $Sf_{CA}$ are generated by a crystal oscillator 50, a lock control circuit 51, and a PN control circuit 52. These components are interconnected as shown. Oscillator 50 generates a clock signal $CK_A$ with a frequency that nominally is $f_A$. Lock control circuit 51 generates a signal $UD_A$ during data transmission which indicates whether the frequency of the PN code from generator 42 needs to speed up or slow down in order to be in sync with the code of the incoming modulated data. Signal $D_B$ is the demodulated data that is received from vehicle $V_B$. Also, signal's $P_A$ and $S_A$ come from external circuits and respectively indicate the position and speed of vehicle $V_A$.

Likewise, in vehicle $V_B$, the signals $S\phi_{MB0}$, $Sf_{MB}$, $S\phi_{CB0}$, and $Sf_{CB}$ are generated by a crystal oscillator 60, a lock control circuit 61, and a PN control circuit 62. Oscillator 60 generates a clock signal $CK_B$ with a frequency that nominally is $f_B$. Lock control circuit 61 generates a signal $UD_B$ during data transmission which indicates whether the frequency of the PN code from generator 22 needs to speed up or slow down in order to be in sync with the code of the incoming modulated data. Signal $D_A$ is the demodulated data from vehicle $V_A$. Also, signals $P_B$ and $S_B$ come from external circuits and respectively indicate the position and speed of the vehicle $V_B$.

As indicated above, the clock signals $CK_A$ and $CK_B$ have nominal frequencies of $f_A$ and $f_B$ respectively. However, the actual frequencies of these clock signals deviate from the nominal value; and, it is the function of the two control signals $S\phi_{MA2}$ and $S\phi_{CA2}$ to compensate for this frequency deviation or drift.

Figure 2:
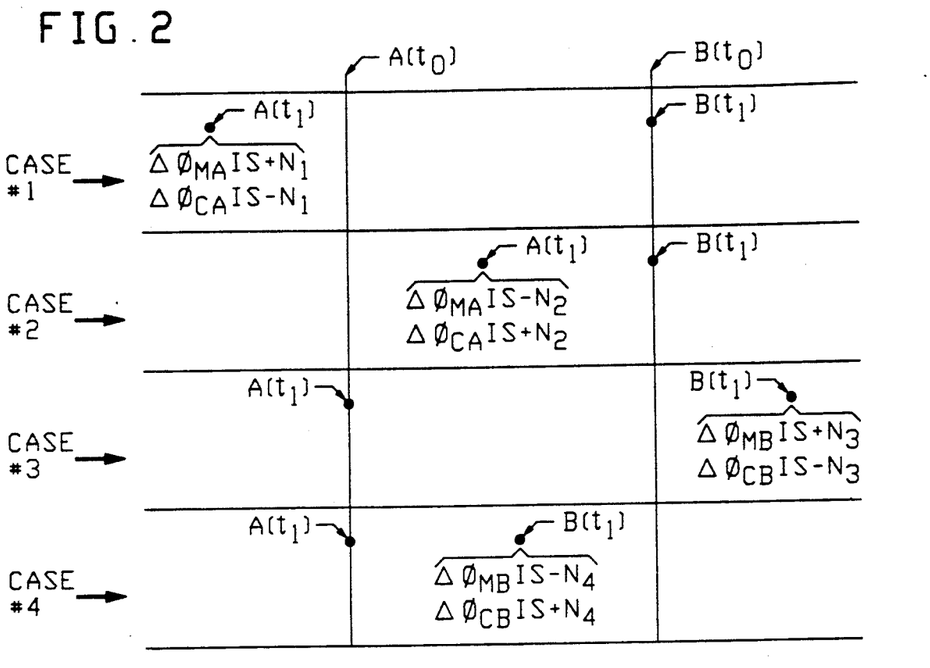
FIG. 2 shows certain phase changes that intentionally occur in the FIG. 1 system when data is not being transmitted and received.
Figure 3:
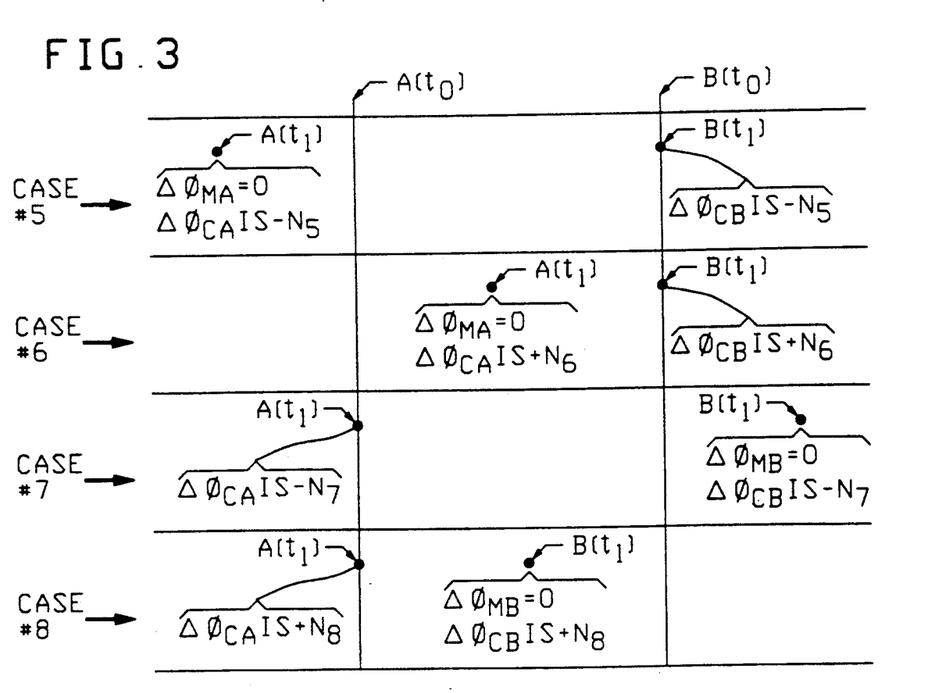
FIG. 3 shows certain phase changes that intentionally occur in the FIG. 1 system when data is being transmitted and received.

How the PN control circuits 50 and 60 utilize their input signals to generate the PN generator control signals is illustrated in FIG's 2, 3 and 4. FIG. 2 shows cases #1 thru #4 which apply when the vehicle $V_A$ and $V_B$ move while data is not being transmitted between them. FIG. 3, shows cases #5 thru #8 which apply when the vehicles $V_A$ and $V_B$ move while data is being transmitted between them. Also, in both FIG's. 2 and 3, the oscillators 50 and 60 are assumed to have no drift; and in FIG. 4, the effect oscillator drift is addressed in cases #9 thru #12.

Figure 4:
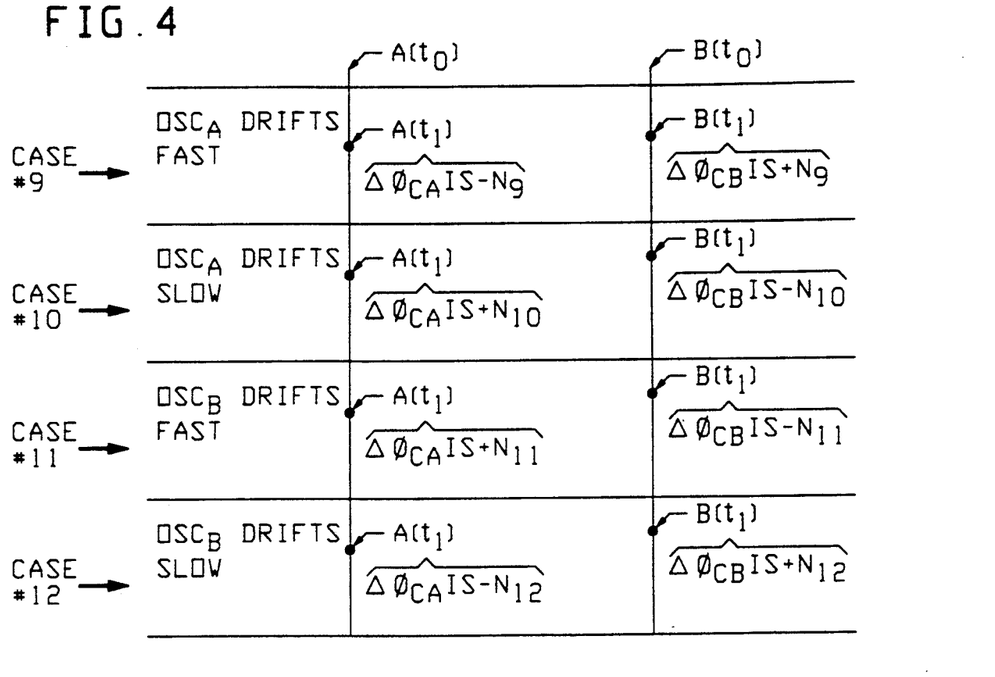
FIG. 4 shows certain phase changes that occur unintentionally in the FIG. 1 system when the oscillators in that system drift in frequency.

For all of the cases #1 thru #12, the vehicles $V_A$ and $V_B$ have respective positions at time $t_0$ of $A(t_0)$ and $B(t_0)$. Then at a later time $t_1$, the position of vehicle $V_A$ is $A(t_1)$; and the position of vehicle $V_B$ is $B(t_1)$. Also, for the sake of simplicity, in all of the cases #1 thru #12 the codes $PN_1$ and $PN_2$ are assumed to have the same nominal frequency (i.e.—same nominal time per bit). Each of these cases will now be described.

Case #1—Here, vehicle $V_A$ moves away from vehicle $V_B$ while no data transmissions occur, and the extent of this movement is provided by the vehicle $V_A$ position signal $P_A$. Due to this movement, the number of $PN_1$ code bits x thru x+N that will exist between the vehicles $V_A$ and $V_B$ during a data transmission increases; and that increase is indicated as $N_1$. Likewise, the number of $PN_2$ code bits y thru y+N that will exist between the vehicles $V_A$ and $V_B$ increases by $N_1$ bits. To compensate for this case #1 movement of vehicle $V_A$, the $PN_1$ code phase $\phi_{MA}$ to modulator 10 is advanced by $N_1$ bits, and the $PN_2$ code phase $\phi_{CA}$ to correlator 41 is delayed by $N_1$ bits. These phase adjustments are specified by the control signals $S\phi_{MA1}$ and $S\phi_{CA1}$.

Case #2—Here, vehicle $V_A$ moves towards vehicle $V_B$ while no data transmissions occur, and the extent of this movement is provided by the vehicle $V_A$ position signal $P_A$. Due to this movement, the number of $PN_1$ code bits x thru x+N that will exist between the vehicles $V_A$ and $V_B$ during a data transmission decreases; and that decrease is indicated as $N_2$. Likewise, the number of $PN_2$ code bits y thru y+N that will exist between the vehicles $V_A$ and $V_B$ decreases by $N_2$ bits. To compensate for this case #2 movement of vehicle $V_A$, the $PN_1$ code phase $\phi_{MA}$ to modulator 10 is delayed by $N_2$ bits, and the $PN_2$ code phase $\phi_{CA}$ to correlator 41 is advanced by $N_2$ bits. These phase adjustments are specified by the control signals $S\phi_{MA1}$ and $S\phi_{CA1}$.

Case #3—Here, vehicle $V_B$ moves away from vehicle $V_A$ while data transmissions occur, and the extent of this movement is provided by the vehicle $V_B$ position signal $P_B$. Due to this movement, the number of $PN_1$ code bits x thru x+N that will exist between the vehicles $V_A$ and $V_B$ during a data transmission increase; and that increase is indicated as $N_3$. Likewise, the number of $PN_2$ code bits y thru y+N that will exist between the vehicles $V_A$ and $V_B$ increases by $N_3$ bits. To compensate for this case #3 movement of vehicle $V_B$, the $PN_2$ code phase $\phi_{MB}$ to modulator 30 is advanced by $N_3$ bits, and the $PN_1$ code phase $\phi_{CB}$ to correlator 21 is delayed by $N_3$ bits. These phase adjustments are specified by the control signals $S\phi_{MB0}$ and $S\phi_{CB0}$.

Case #4—Here, vehicle $V_B$ moves towards vehicle $V_A$ while no data transmissions occur, and the extent of this movement is provided by the vehicle $V_B$ position signal $P_B$. Due to this movement, the number of PN code bits x thru x+N that will exist between the vehicles $V_A$ and $V_B$ during a data transmission decrease; and that decrease is indicated as $N_4$. Likewise, the number of $PN_2$ code bits y thru y+N that will exist between the vehicles $V_A$ and $V_B$ decreases by $N_4$ bits. To compensate for this case #4 movement of vehicle $V_B$, the $PN_2$ phase $\phi_{MB}$ to modulator 30 is delayed by $N_4$ bits, and the $PN_1$ code phase $\phi_{CB}$ to correlator 21 is advanced by $N_4$ bits. These phase adjustments are specified by the control signals $S\phi_{MB0}$ and $S\phi_{CB0}$.

Case #5—Here, vehicle $V_A$ moves away from vehicle $V_B$ while data transmissions occur, and the effect of this movement is tracked by the lock control circuits 51 and 61. Due to this movement, the number of $PN_1$ code bits x thru x+N between the vehicles $V_A$ and $V_B$ increases; and that increase is indicated as $N_5$. Likewise, the number of $PN_2$ code bits L y thru y+N between the vehicles $V_A$ and $V_B$ increases by $N_5$ bits. To compensate for this case #5 movement of vehicle $V_A$, the $PN_1$ code phase $\phi_{CB}$ to correlator 21 is delayed by $N_5$ bits, and the $PN_2$ code phase $\phi_{CA}$ to correlator 41 is delayed by $N_5$ bits. These phase adjustments are made by the frequency control signals $Sf_{CA}$ and $Sf_{CB}$. That is, the frequency of the codes $PN_1$ and $PN_2$ is decreased.

Case #6—Here, vehicle $V_A$ moves towards vehicle $V_B$ while data transmissions occur, and the effect of this movement is tracked by the lock control circuits 51 and 61. Due to this movement, the number of $PN_1$ code bits x thru x+N between the vehicles $V_A$ and $V_B$ decreases; and that decrease is indicated as $N_6$. Likewise, the number of $PN_2$ code bits y thru y+N between the vehicles $V_A$ and $V_B$ decreases by $N_6$ bits. To compensate for this case #6 movement of vehicle $V_A$, the $PN_1$ code phase $\phi_{CB}$ to correlator 21 is advanced by $N_6$ bits, and the $PN_2$ code phase $\phi_{CA}$ to correlator 41 is advanced by $N_6$ bits. These phase adjustments are made by the frequency control signals $Sf_{CA}$ and $Sf_{CB}$. That is, the frequency of the codes $PN_1$ and $PN_2$ is increased.

Case #7—Here, vehicle $V_B$ moves away from vehicle $V_A$ while data transmissions occur, and the effect of this movement is tracked by the lock control circuits 51 and 61. Due to this movement, the number of $PN_1$ code bits x thru x+N between the vehicles $V_A$ and $V_B$ increases; and that increase is indicated as $N_7$. Likewise, the number of $PN_2$ code bits y thru y+N between the vehicles $V_A$ and $V_B$ increases by $N_7$ bits. To compensate for this case #7 movement of vehicle $V_B$, the $PN_1$ code phase $\phi_{CB}$ to correlator 21 is delayed by $N_7$ bits, and the $PN_2$ code phase $\phi_{CA}$ to correlator 41 is delayed by $N_7$ bits. These phase adjustments are made by the frequency control signals $Sf_{CA}$ and $Sf_{CB}$.

Case #8—Here, vehicle $V_B$ moves toward vehicle $V_A$ while data transmissions occur, and the effect of this movement is tracked by the lock control circuits 51 and 61. Due to this movement, the number of $PN_1$ code bits x thru x+N between the vehicles $V_A$ and $V_B$ decreases; and that decrease is indicated as $N_8$. Likewise, the number of $PN_2$ code bits y thru y+N between the vehicles $V_A$ and $V_B$ decreases by $N_8$ bits. To compensate for this case #8 movement of vehicle $V_A$, the $PN_1$ code phase $\phi_{CB}$ to correlator 21 is advanced by $N_8$ bits, and the $PN_2$ code phase $\phi_{CA}$ to correlator 41 is advanced by $N_8$ bits. These phase adjustments are made by the frequency control signals $Sf_{CA}$ and $Sf_{CB}$.

Case #9—Here, vehicle $V_A$ has no movement relative to vehicle $V_B$. However, the clock signal $CK_A$ from oscillator 50 drifts above its nominal frequency. Due to this drift, the number of $PN_1$ code bits x thru x+N that will exist between the vehicles $V_A$ and $V_B$ during a data transmission increases; and that increase is indicated as $N_9$. Likewise, the number of $PN_2$ code bits from PN generator 42 to correlator 41 in vehicle $V_A$ increases by $N_9$ bits. To compensate for this case #9 drift in oscillator frequency, the $PN_1$ code phase $\phi_{CB}$ to correlator 21 is advanced by $N_9$ bits, and the $PN_2$ code phase $\phi_{CA}$ to correlator 41 is delayed by $N_9$ bits.

Case #10—Here, vehicle $V_A$ has no movement relative to vehicle $V_B$. However, the clock signal $CK_A$ from oscillator 50 drifts below its nominal frequency. Due to this drift, the number of $PN_1$ code bits x thru x+N that will exist between the vehicles $V_A$ and $V_B$ during a data transmission decreases; and that decrease is indicated as $N_{10}$. Likewise, the number of PN$_2$ code bits from PN generator 42 to correlator 41 in vehicle $V_A$ decreases by $N_{10}$ bits. To compensate for this case #10 drift in oscillator frequency, the PN$_1$ code phase $\phi_{CB}$ to correlator 21 is delayed by $N_{10}$ bits, and the PN$_2$ code phase $\phi_{CA}$ to correlator 41 is advanced by $N_{10}$ bits.

Case #11—Here, vehicle $V_A$ has no movement relative to vehicle $V_B$. However, the clock signal CK$_B$ from oscillator 60 drifts above its nominal frequency. Due to this drift, the number of PN$_2$ code bits Y thru Y+N that will exist between the vehicles $V_B$ and $V_A$ during a data transmission increases; and that increase is indicated as $N_{11}$. Likewise, the number of PN$_2$ code bits from PN generator 22 to correlator 21 in vehicle $V_B$ increases by $N_{11}$ bits. To compensate for this case #11 drift in oscillator frequency, the PN$_1$ code phase $\phi_{CB}$ to correlator 21 is delayed by $N_{11}$ bits, and the PN$_2$ code phase $\phi_{CA}$ to correlator 41 is advanced by $N_{11}$ bits.

Case #12—Here, vehicle $V_A$ has no movement relative to vehicle $V_B$. However, the clock signal CK$_B$ from oscillator 60 drifts below its nominal frequency. Due to this drift, the number of PN$_2$ code bits Y thru Y+N that will exist between the vehicles $V_B$ and $V_A$ during a data transmission decreases; and that decrease is indicated as $N_{12}$. Likewise, the number of PN$_2$ code bits from PN generator 22 to correlator 21 in vehicle $V_B$ decreases by $N_{12}$ bits. To compensate for this case #12 drift in oscillator frequency, the PN$_1$ code phase $\phi_{CB}$ to correlator 21 is delayed by $N_{12}$ bits, and the PN$_2$ code phase $\phi_{CA}$ to correlator 41 is advanced by $N_{12}$ bits.

Now, in any given time interval, several of the cases #1 thru #12 can occur in combination; and, the resulting effect on the phase changes is given superposition. Further, by examining all of the above described cases #1 thru #12, an equation can be derived which expresses the total drift of the oscillators 50 and 60 in terms of the various phase changes which occur. This expression for drift is derived in FIG. 5.

Figure 5:
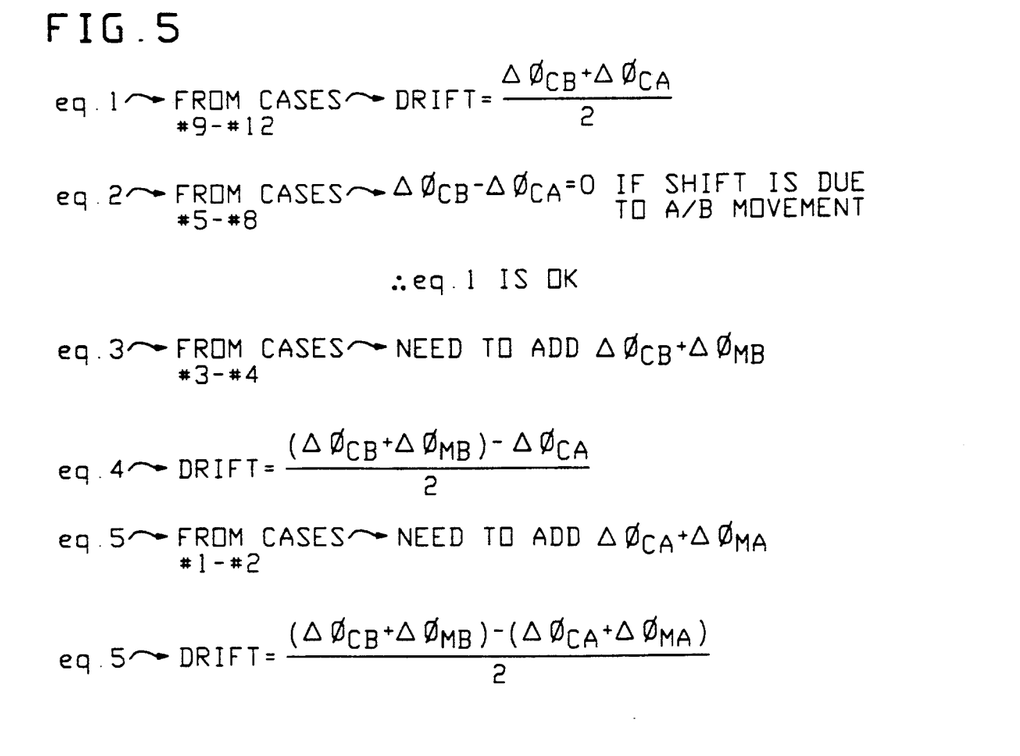
FIG. 5 is a set of equations which derive an expression for oscillator drift in the FIG. 1 system in terms of the phase changes that occur in FIG's. 2, 3, 4.

Consider first just the cases #9 thru #12. There, the phase change $\Delta\phi_{CA}$ is produced totally by drift, and the phase change $\Delta\phi_{CB}$ is also produced totally by drift. Further, these phase changes $\Delta\phi_{CA}$ and $\Delta\phi_{CB}$ are equal in magnitude and opposite in polarity Thus, for cases #9 thru #12, the combined drift of the oscillators 50 and 60 can be expressed as equation 1 wherein a "+" value indicates the drift is fast and a "−" value indicates the drift is slow.

Next consider the cases #5 thru #8. There, the movement of the vehicles $V_A$ and $V_B$ (rather than oscillator drift) is the cause of the phase changes $\Delta\phi_{CA}$ and $\Delta\phi_{CB}$. However, phase changes $\Delta\phi_{CA}$ and $\Delta\phi_{CB}$ in cases #5 thru #8 have equal magnitude and the same polarity. Thus, if the phase changes in equation 1 are due partly to vehicle movement of cases #5 thru #8 and partly to oscillator drift of cases #9 thru #12, the portion of phase changes due to vehicle movement will cancel. Consequently, equation 1 is a valid measure of drift for all of the cases #5 thru #12, and this is stated by equation 2.

Next, consider the cases #3 and #4. There, the movement of vehicle $V_B$ causes the phase change $\Delta\phi_{CB}$; and it also causes a phase change $\Delta\phi_{MB}$ which is equal in magnitude but opposite in polarity to the $\Delta\phi_{CB}$ phase change. Now this phase change $\Delta\phi_{CB}$ of cases #3 and #4 needs to be subtracted from the total $\Delta\phi_{CB}$ phase change as produced by all the cases in order to be left with a $\Delta\phi_{CB}$ phase change of just cases #9 thru #12. To achieve that subtraction, the phase change $\Delta\phi_{MB}$ need only be added to the total phase change $\Delta\phi_{CB}$. This is stated by equation 3; and, the resulting new equation for drift is given by equation 4.

Lastly, consider the cases #1 and #2. There, the movement of vehicle $V_A$ causes the phase change $\Delta\phi_{CA}$; and it also causes a phase change $\Delta\phi_{MA}$ which is equal in magnitude but opposite in polarity to the $\Delta\phi_{CA}$ phase change. This phase change $\Delta\phi_{CA}$ of cases #1 and #2 needs to be subtracted from the total $\Delta\phi_{ca}$ phase change as produced by all the cases in order to be left with a $\Delta\phi_{CA}$ phase change of just cases #9 thru #12. To achieve that subtraction, the phase change $\Delta\phi_{MA}$ need only be added to the total phase change $\Delta\phi_{CA}$. This is stated by equation 5; and, the resulting final equation for drift is given by equation 6.

Figure 6:
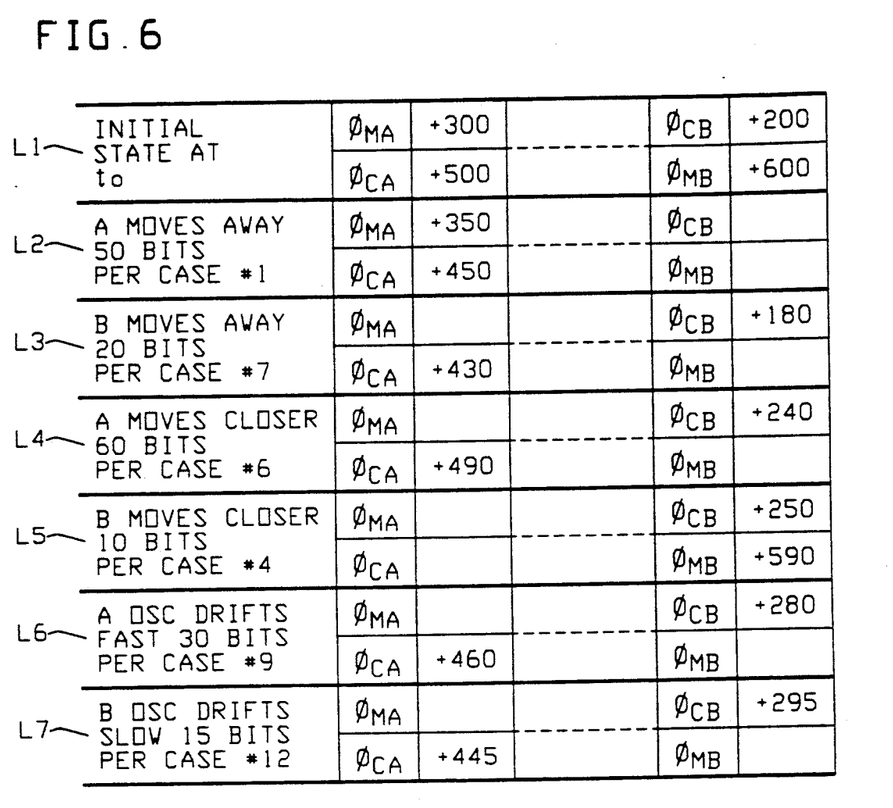
FIG. 6 is a numerical example of the phase changes that occur in FIG's. 2, 3, and 4.
Figure 7:
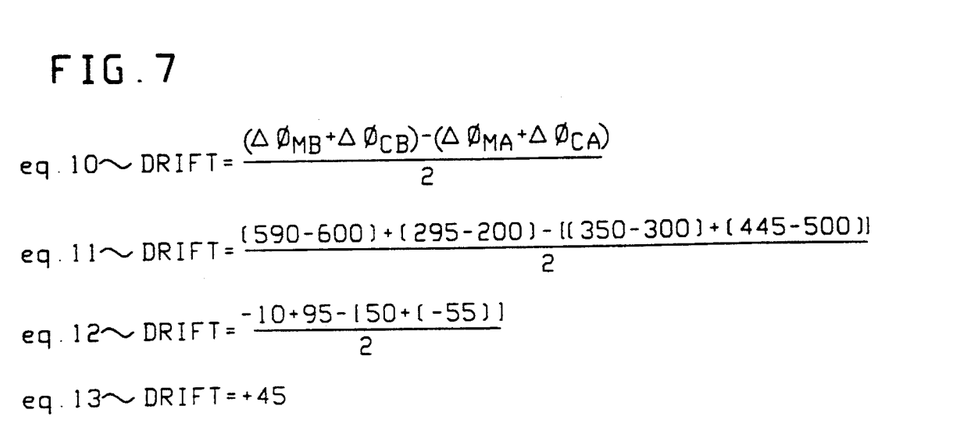
FIG. 7 is a set of equations which compute drift in the numerical example of FIG. 6.

Turning now to FIG's. 6 and 7, they show a numerical example of how drift is determined by equation 6. In FIG. 6, the first line L1 gives the initial value, at time $t_0$ of the PN$_1$ code phases $\phi_{MA}$ and $\phi_{CB}$; and, line L1 also gives the initial value of PN$_2$ code phases $\phi_{MB}$ and $\phi_{CA}$.

These code phases of line L1 indicate that the vehicles $V_A$ and $V_B$ are separated initially by 100 code bits. That is, the distance between vehicles is (100)(C)(T) where T is the time per bit of the PN code and C is the speed of light.

Next in FIG. 6, the lines L2 thru L7 list various events which occur after time $t_0$ that cause the PN code phases to change. Each of these events corresponds to one of the above described cases #1 thru #12.

At line L2, vehicle $V_A$ moves away from vehicle $V_B$ by 50 PN code bits as per case #1. Thus, $\phi_{MA}$ changes from +300 to +350; and, $\phi_{CA}$ changes from +500 to +450.

At line L3, vehicle $V_B$ moves away from vehicle $V_A$ by 20 bits as per case #7. Thus, $\phi_{CB}$ changes from +200 to +180; and $\phi_{CA}$ changes from +450 to +430.

At line L4, vehicle $V_A$ moves closer to vehicle $V_B$ by 60 bits per case #6. Thus, $\phi_{CB}$ changes from +180 to +240; and, $\phi_{CA}$ changes from +430 to +490.

At line L5, vehicle $V_B$ moves closer to vehicle $V_A$ by 10 bits per case #4. Thus, $\phi_{CB}$ changes from +240 to +250; and $\phi_{MB}$ changes from +600 to +590.

At line L6, the oscillator in vehicle $V_A$ drifts fast 30 bits as per case #9. Thus, $\phi_{CA}$ changes from +490 to +460; and, $\phi_{CB}$ changes from +250 to +280.

At line L7, the oscillator in vehicle $V_B$ drifts slow 15 bits as per case #12. Thus, $\phi_{CA}$ changes from +460 to +445; and, $\phi_{CB}$ changes from +280 to +295.

In FIG. 7, equation 10 restates the previously derived equation 5 for drift. Next in FIG. 7, equation 11 is obtained by substituting into equation 10 the numerical values of the total phase changes that occurred in the FIG. 6 example. Then, equation 11 is evaluated as shown by equation 12; and that yields a final value drift of +45.

Suppose now that all of the above phase changes of equation 10 occur over a time interval $\Delta T_X$. In that case, a drift rate DR can be expressed as stated by equation 20 in FIG. 8.

Figure 8:
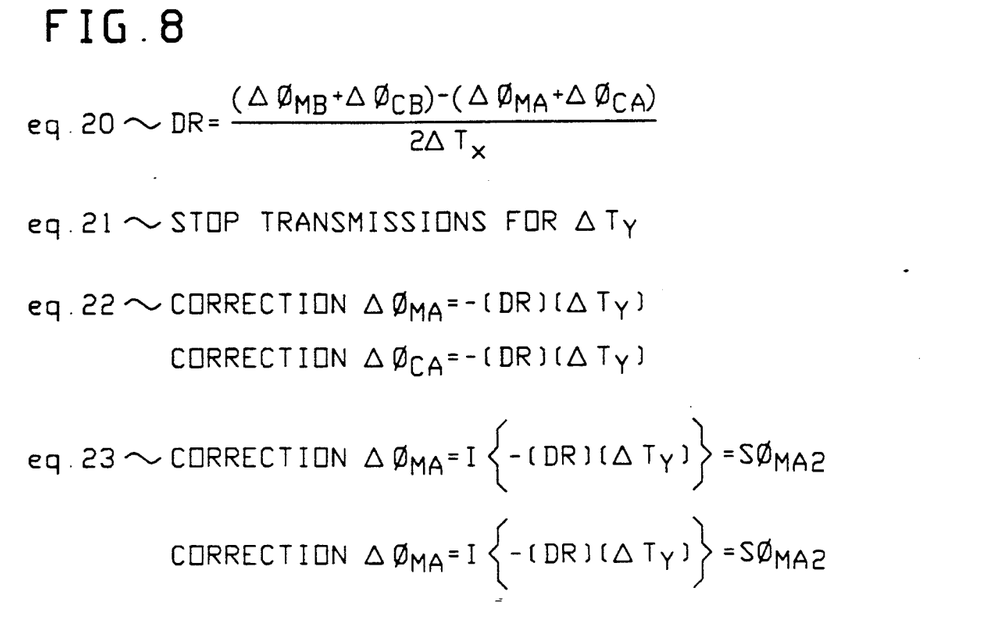
FIG. 8 is a set of equations which state how drift is compensated for in accordance with the invention when the two stations of FIG. 1 transmit to each other at the same bit rate.

Next, suppose that after the above drift rate DR is determined, all data transmissions between the vehicles $V_A$ and $V_B$ stop for a time interval $\Delta T_Y$. This is stated by equation 21. During that time interval $\Delta T_Y$, the oscillators 50 and 60 will continue to drift at or near the drift rate DR. Thus, if data transmission between the vehicles $V_A$ and $V_B$ is attempted to be re-established at the end of time interval $\Delta T_Y$, the PN code phases $\phi_{MA}$ and $\phi_{CB}$ will be misaligned, and the PN code phases $\phi_{MB}$ and $\phi_{CA}$ and will be misaligned.

However, the code phases $\phi_{MA}$ and $\phi_{CB}$ can be realigned by shifting code phase $\phi_{MA}$ by an amount $-DR[\Delta T_Y]$. Likewise, the code phases $\phi_{MB}$ and $\phi_{CA}$ can be realigned by shifting code phase $\phi_{CA}$ by $-DR[\Delta T_Y]$. This is stated by equation 22.

Note that the amount $DR[\Delta T_Y]$ will in general not be an integer; and so to simplify implementation of the above phase shifts, the amount of the shift preferably is $I\{DR[\Delta T_Y]\}$ where $I\{\ \}$ indicates the largest integer within the brackets. This is stated in FIG. 8 by equation 23. That equation 23 phase shift will be specified in FIG. 1 by the control signals $S\phi_{MA2}$ and $S\phi_{CA2}$.

A primary feature of the above described drift compensation process is that it enables data transmissions between the vehicles $V_A$ and $V_B$ to be re-established very quickly. Suppose, for example, that $\Delta T_X$ in equation 20 is 2 seconds and $\Delta T_Y$ in equation 21 is 2 hours. In that case, the drift rate for the example of FIG's 6 and 7 would be $45 \div 2$ bits/sec or 22.5 bits/sec. Thus, the total drift during $\Delta T_Y$ would be $(2)(60)(60)(22.5)$ bits or 162,000 bits.

Without the present drift compensation, the above 162,000 bit offset would be undetected; and thus, data transmissions can be re-established only by guessing at how much to shift the PN codes to the correlators until proper alignment is achieved through trial and error. But with the present invention, the above 162,000 bit offset is known and completely eliminated by equation 23.

Throughout the above description of FIG's 2 thru 8, it was assumed for the sake of simplicity that the PN codes $PN_1$ and $PN_2$ had the same nominal frequency. However, the present invention also applies when the PN codes $PN_1$ and $PN_2$ have different nominal frequencies. This is shown in FIG. 9.

Figure 9:
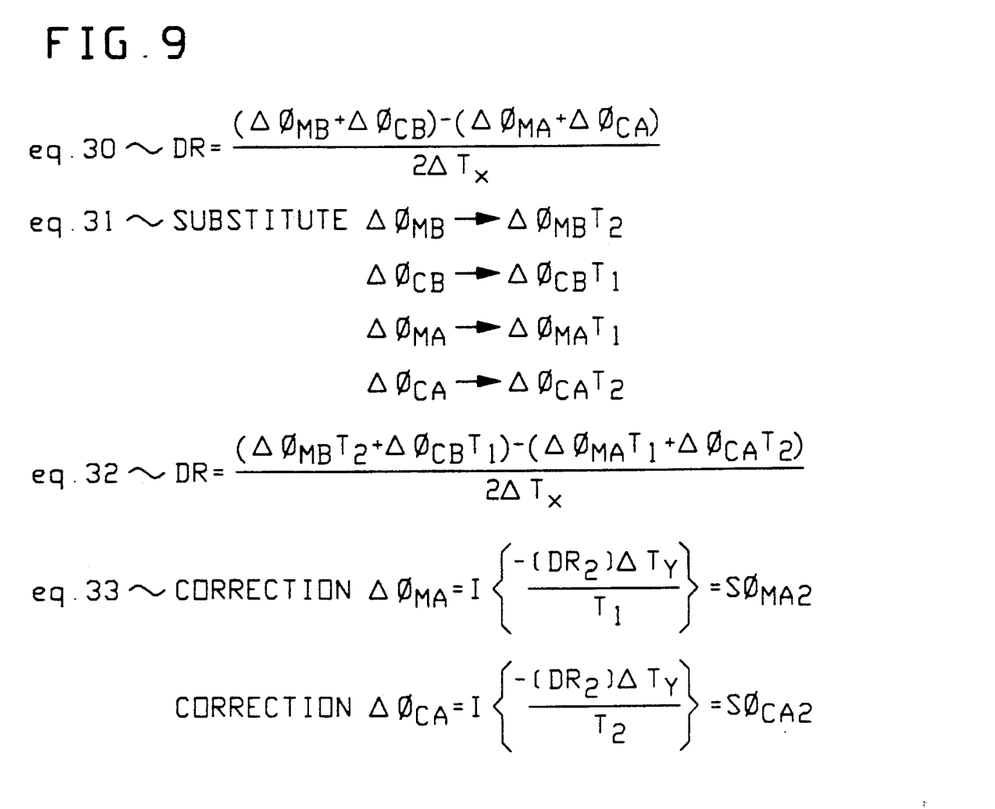
FIG. 9 is a set of equations which state how drift is compensated for in accordance with the invention when the two stations of FIG. 1 transmit to each other at different bit rates; and, FIG. 10 shows the internal makeup of two circuit blocks in the FIG. 1 system which utilize the drift compensation equations of FIG's. 8 and 9 to compensate for drift.

To begin in FIG. 9, equation 30 gives an expression for drift rate in terms of PN code phase shifts $\Delta\phi_{MA}$, $\Delta\phi_{CA}$, $\Delta\phi_{MB}$, and $\Delta\phi_{CB}$ as was previously derived in FIG's. 5 and 8. Recall that equation 30 was derived by analyzing the various phase shift results that occurred in codes #1 thru #12. In case #1, for example, the phase shift $\Delta\phi_{MA}$ was $+N_1$ and the phase shift $\Delta\phi_{CA}$ was $-N_1$. Now, if in case #1, the frequency of code $PN_1$ was twice the frequency of code $PN_2$, then the case #1 result will be changed to $\Delta\phi_{MA}=+2N_1$ and $\Delta\phi_{CA}=-N_1$.

In more general terms, suppose in case #1 that the time period per bit of code $PN_1$ is $T_1$ and the time period per bit of code $PN_2$ is $T_2$. Then the result of case #1 will be changed to $\Delta\phi_{MA}T_1 = -\Delta\phi_{CA}T_2$.

Each of the phase shift results in cases #1 thru #12 can be generalized in a similar fashion. Thus, to express equation 30 in more general terms, all that is needed is a substitution of variables as given by equation 31. Making the substitution of equation 31 into equation 30 yields equation 32.

If data transmissions stop for the time period $\Delta T_Y$, then to compensate for drift, the $PN_1$ code from PN generator 11 is shifted in time by $-DR_2[\Delta T_Y]$; or equivalently, it is shifted in bits by $-DR_2[\Delta T_Y] \div T_1$. Likewise, the $PN_2$ code from generator 42 is shifted in time by $-DR_2[\Delta T_Y]$; or equivalently, it is shifted in bits by $-DR_2[\Delta T_Y] \div T_2$. This is stated by equation 33; and, in FIG. 1, the phase shifts of equation 33 are specified by the control signals $S\phi_{MA2}$ and $S\phi_{CA2}$.

Figure 10:
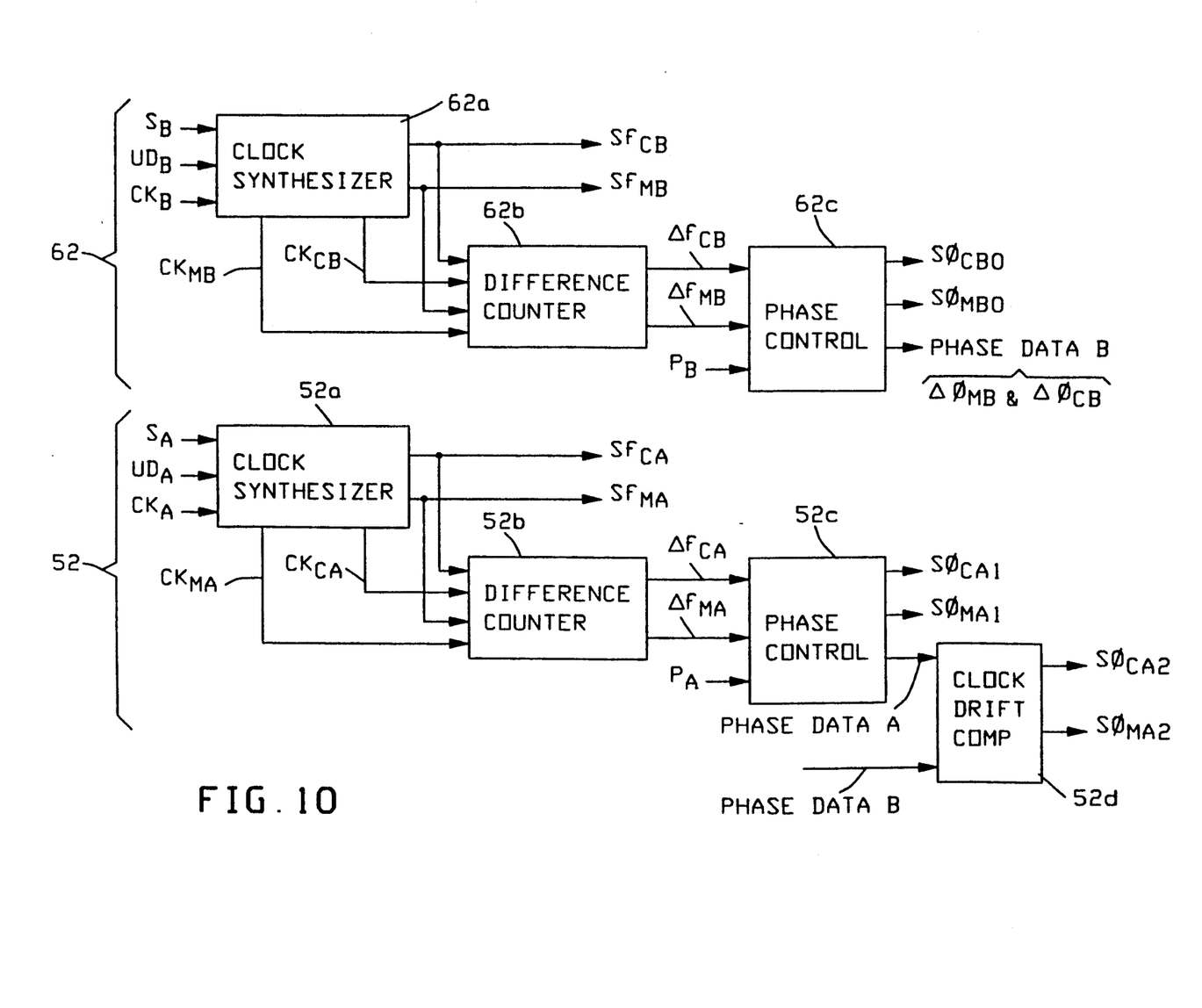

Turning now to FIG. 10, it shows the internal makeup of PN control circuits 52 and 62 which generate all of the above control signals. PN Control Circuit 52 includes a clock synthesizer 52a, a difference counter 52b, a phase control circuit 52c, and a clock drift compensation circuit 52d. All of those components are interconnected as illustrated. Similarly, PN control circuit 62 includes a clock synthesizer 62a, a difference counter 62b, and a phase control circuit 62c.

Considering first the phase control circuit 52c, it receives the position signal $P_A$ for vehicle $V_A$, and in response, generates the phase control signals $S\phi_{CA1}$, and $S\phi_{MA1}$. This operation occurs during the previously described cases #1 and #2. For example, in case #1, vehicle $V_A$ moves away from vehicle $V_B$ while no data transmissions occur. In that case, circuit 52c determines the extent of the movement from signal $P_A$ in terms of $PN_1$ code bits, and the result is indicated in the control signals $S\phi_{CA1}$ and $S\phi_{MA1}$. For example, if vehicle $V_A$ moves 1000 feet away from vehicle $V_B$ and the modulated data from vehicle $V_A$ travels 2 feet during one Bit time of code $PN_1$, then signal $S\phi_{MA1}$ will be +500.

Similarly the phase control circuit 62c receives the position signal $P_B$ for vehicle $V_B$, and in response, indicates the distance traveled in terms of $PN_2$ code bits in the phase control signals $S\phi_{CB}$ and $S\phi_{MB}$. This operation occurs during the previously described cases #3 and #4.

Next, considering the clock synthesizer 52a, it uses the oscillator clock signal $CK_A$ to internally synthesize another clock $CK_A$ which nominally is at the desired correlation frequency for vehicle $V_A$. That clock signal $CK_{CA}$ is then processed within circuit 52a in response to the $UD_A$ signal from the lock circuit 51 and the velocity signal $V_A$; and, the resulting signal is $Sf_{CA}$. This signal processing includes shifting the frequency of signal $Sf_{CA}$ up/down during data transmissions in response to signal $UD_A$ in order to stay locked to incoming data, and shifting the frequency of signal $Sf_{CA}$ up/down in response to the speed signal $S_A$ in order to compensate for Doppler shifts.

Likewise, the clock synthesizer 52a uses the oscillator clock signal $CK_A$ to internally synthesize another clock $CK_{MA}$ which nominally is at the desired modulation frequency for vehicle $V_A$. That clock signal $CK_{MA}$ is then processed in response to the speed signal $S_A$ in order to compensate for Doppler shift; and the resulting signal is $Sf_{MA}$. These two signals $Sf_{CA}$ and $Sf_{MA}$ are used in the previously described cases #5 thru #8.

Similarly, the clock synthesizer 62a, uses the oscillator clock signal $CK_B$ to internally synthesize another clock $CK_{CB}$ which nominally is at the desired correlation frequency for vehicle $V_B$. That clock signal $CK_{CB}$ is then processed during data transmissions in response to the $UD_B$ signal from the lock circuit 61 in order to stay locked to incoming data, and the speed signal $S_B$ in order to compensate for Doppler shift; and, the resulting signal is $Sf_{CB}$.

Likewise, the clock synthesizer 52a uses the oscillator clock signal $CK_B$ to internally synthesize another clock $CK_{MB}$ which nominally is at the desired modulation frequency for vehicle $V_B$. That clock signal $CK_{MB}$ is then processed in response to the speed signal $S_B$ in order to compensate for Doppler shift; and the resulting signal is $Sf_{MB}$. These two signals $Sf_{CB}$ and $Sf_{MB}$ are used in the previously described cases #5 thru #8.

Considering next the difference counter circuit 52b, it detects the difference in frequency between the signals $CK_{CA}$ and $Sf_{CA}$. In FIG. 10, a signal $\Delta f_{CA}$ gives this difference in frequency. For example, $\Delta f_{CA} = +10$ indicates the frequency of signal $CK_{CA}$ is more than the frequency of signal $Sf_{CA}$ by $+10$ cycles/sec. Also, circuit 52b detects the difference in frequency between the signal $CK_{MA}$ and $Sf_{MA}$, and a signal $\Delta f_{MA}$ gives that difference in frequency. For example, $\Delta f_{MA} = -5$ indicates the frequency of signal $CK_{MA}$ is less than frequency signal $Sf_{MA}$ by 5 cycles/sec.

Likewise, the difference counter circuit 62b detects the difference frequency between the signals $CK_{CB}$ and $Sf_{CB}$. In FIG. 10, a signal $\Delta f_{CB}$ gives this difference in frequency. Also, circuit 62b detects the difference in frequency between the signal $CK_{MB}$ and $Sf_{MB}$, and a signal $\Delta f_{MB}$ gives that difference in frequency.

One of the causes for the signals $\Delta f_{CA}$ and $\Delta f_{CB}$ to have non-zero values is the occurrence of the FIG. 3 cases #5 thru #8. In case #5, for example, vehicle $V_A$ moves while data is being transmitted and received; and so in order for the PN codes to the correlators to stay locked to the PN code in the received modulated data, the PN codes to the correlators must change phase. This need for a phase change as sensed in the lock circuits and indicated by the up/down signals $UD_A$ and $UD_B$, which in turn produces a frequency change in the signals $Sf_{CA}$ and $Sf_{CB}$.

Also, another cause for the signals $\Delta f_{CA}$ and $\Delta f_{CB}$ to have non-zero values is the occurrence of the FIG. 4 cases #9 thru #12. In case #9, for example, the oscillator clock signal $CK_A$ drifts fast while data is being transmitted. Thus, in order for the PN codes to the correlators to stay locked to the PN code in the received modulated data, the PN codes to the correlators must change phase. That need for a phase change is sensed in the lock circuits and indicated by the up/down signals $UD_A$ and $UD_B$, which in turn produces a frequency change in the signals $Sf_{CA}$ and $Sf_{CB}$.

Further, a cause for the signals $\Delta f_{MA}$ and $\Delta f_{MB}$ to have non-zero values is the occurrence of the speed signals $S_A$ and $S_B$ in cases #5 thru #12. This is because in response to the speed signals, the frequency of the modulator signals $Sf_{MA}$ and $Sf_{MB}$ is shifted up or down from its nominal value in order to compensate for Doppler effects Now in vehicle $V_A$, both of the signals $\Delta f_{CA}$ and $\Delta f_{MA}$ are sent to the phase control circuit 52c; and there, the corresponding change in phase is integrated over time. For example, if signal $\Delta f_{CA}$ equals $+10$ cycles per second, circuit 52 will internally store $\int \Delta f_{CA} = +10$ after 1 second, $= +20$ after 2 seconds; etc. Likewise, if $\Delta f_{MA}$ equals $-2$ cycles per second, then circuit 52 will store $\int \Delta f_{MA} = -2$ after 1 second, $= -4$ after 2 seconds, etc.

Also, circuit 52c adds to the above quantities $\int \Delta f_{CA}$ and $\int \Delta f_{MA}$, any phase change that is specified by the signals $S\phi_{MA}$ and $S\phi_{CA1}$. For example, if the signals $S\phi_{CA1} = -5$ and $S\phi_{MA} = +5$ due to a case #1/#2 type change in position of vehicle $V_A$, then the above integration will be modified to $\int \Delta f_{CA} = +-5$ or $+15$ and $\int \Delta_{MA} = -4 + 5$ or $+1$. This net result is provided by circuit 52c as "Phase Data A", and it equals the terms $\Delta \phi_{MA}$ and $\Delta \phi_{CA}$ in the previously derived equation 32 of FIG. 9.

Likewise, in vehicle $V_B$, both of the signals $\Delta f_{CB}$ and $\Delta f_{MB}$ are sent to the phase control circuit 62c; and there, the corresponding phase changes are integrated over time. Also, circuit 62c adds to that integration any phase shift that is specified by the signals $S\phi_{CB0}$ and $S\phi_{MB0}$ due to a case #3/#4 type change in position of vehicle $V_B$. This net result is provided by circuit 62c as "Phase Data B", and it equals the terms $\Delta \phi_{MB}$ and $\Delta \phi_{CB}$ in equation 32 of FIG. 9.

In order to transmit the "Phase Data B" information from vehicle $V_B$ to vehicle $V_A$, a multiplexer 23 is included in vehicle $V_A$ as shown in FIG. 1. Then in vehicle $V_A$, the "Phase Data B" information is received by the FIG. 10 clock drift compensation circuit 52d. That circuit 52d then combines the "Phase Data A" information and "Phase Data B" information in accordance with equation 32 of FIG. 9 to thereby obtain the oscillator drift rate DR.

After the drift rate DR is determined, that value is stored in circuit 52d. Thereafter, when data transmissions between the vehicle $V_A$ and $V_B$ stop, circuit 52 measures the time interval $\Delta T_Y$ which passes until data transmissions are to be re-established. Then, just prior to starting the new transmissions, circuit 52d determines the values of the phase shift correction terms $\Delta \phi_{MA}$ and $\Delta \phi_{CA}$ as given by equation 33 of FIG. 9; and, circuit 52d generates the signals $S\phi_{MA2}$ and $S\phi_{CA2}$ with those values.

In vehicle $V_B$, the Phase Data B information must be accumulated during the same time internal $\Delta T_X$ that the Phase Data A information is accumulated in vehicle $V_A$. Thus, to synchronize this accumulation of data, vehicle $V_A$ sends a command to vehicle $V_B$ which starts the time interval $\Delta T_X$ when the command is received.

Alternatively, the vehicles $V_A$ and $V_B$ both receive a timing signal for an external source, and the time interval $\Delta T_X$ starts upon receipt of that timing signal. For example, the vehicle $V_A$ and $V_B$ receives the time of day from a satellite; and in response the vehicle $V_A$ and $V_B$ starts the time interval $\Delta T_X$ every 1-10 minutes.

Also, as another alternative, the Phase Data B information that is transmitted to vehicle $V_A$ is the PN code phases $\phi_{MB}$ and $\phi_{CA}$ which occur at the start of time interval $\Delta T_X$, and the PN code phases $\phi_{MB}$ and $\phi_{CA}$ which occur at the end of time interval $\Delta T_X$. Those four phase values are simply subtracted in vehicle $V_A$ in order to obtain the terms $\Delta \phi_{MB}$ and $\Delta \phi_{CB}$ in the drift rate equation 32.

Further, as still another modification, only one of the oscillators 50 and 60 in FIG. 1 is a crystal oscillator which drifts; and, the other oscillator is an atomic oscillator. Also, the oscillator which drifts need not be a crystal oscillator; it can be any oscillator which drifts substantially more in frequency than an atomic oscillator. Atomic oscillators are characterized as having a frequency drift of less $10^{-9}$ cycle per cycle over their lifetime, whereas the oscillators 50 and/or 60 can have a drift which is larger by a factor of ten, or a hundred, or a thousand.

As still another modification, the phase shift correction terms $\Delta \phi_{MB}$ and $\Delta \phi_{CA}$ as given by equation 33 of FIG. 9 can be changed to $\Delta \phi_{MA} \approx -(DR)\Delta T_Y \div T_1$ and $\Delta \phi_{CA} \approx (DR)\Delta T_Y \div T_2$. Here, the approximate sign "$\approx$" enables a particular implementation to make minor deviations from equation 33 and still use the basic inventive concept. Preferably, the modified phase corrections as given above are within 10% of the phase correction as given by equation 33.

As yet another modification, the phase of code $PN_1\phi_{MA}$ can be shifted by the correction amount $\Delta \phi_{MA}$ as given above by utilizing signal $Sf_{MA}$, rather than signal $S\phi_{MA2}$, to achieve that shift. For example, if the phase correction $\Delta\phi_{MA}$ is to be +1000 bits, then signal $Sf_{MA}$ can be increased in frequency by +100 $H_3$ for 10 seconds. Likewise, the phase of code $PN_2\phi_{CA}$ can be shifted by the correction amount $\Delta\phi_{CA}$ as given above by utilizing signal $Sf_{CA}$. For example, if the correction $\Delta\phi_{CA}$ is −500 bits, then signal $Sf_{CA}$ can be decreased in frequency by +100$H_3$ for 5 seconds.

In view of the above variations and modifications, it is to be understood that the invention is not limited to just the preferred method and circuitry as illustrated in the figures but is defined by the appended claims.

What is claimed is:

1. A method in a communication system where - a) two vehicles $V_A$ and $V_B$ transmit data to each other intermittently, b) data transmitted from $V_A$ to $V_B$ is modulated in $V_A$ by a PN code PN having a time varying phase $\phi_{MA}$ and is correlated in $V_B$ by said code $PN_1$ having a different time varying phase $\phi_{CB}$, and c) data transmitted from $V_B$ to $V_A$ is modulated in $V_B$ by a PN code $PN_2$ having a time varying phase $\phi_{MB}$ and is correlated in $V_A$ by said code $PN_2$ having a different time varying phase $\phi_{CA}$; wherein said codes $PN_1$ and $PN_2$ have respective nominal frequencies $f_1 = 1/T_1$ and $f_2 = 1/T_2$ that drift in at least one of said vehicles, and wherein said method compensates for said drift by including the steps of:

sensing, during said data transmissions, the phase shifts $\Delta\phi_{MA}$, $\Delta\phi_{CA}$, $\Delta\phi_{MB}$ and $\Delta\phi_{CB}$ which respectively occur in said PN codes over a time interval $\Delta T_X$;

calculating a drift rate DR from the sensed phase shifts where $$DR = \frac{(\Delta\phi_{CB}T_1 + \Delta\phi_{MB}T_2) - (\Delta\phi_{CA}T_2 + \Delta\phi_{MA}T_1)}{2\Delta T_x};$$

stopping said data transmissions between $V_A$ and $V_B$ for a time interval $\Delta T_Y$; and thereafter, phase shifting, in one of said vehicles, code $PN_1$ by an amount $C_1 \approx -(DR)\Delta T_Y \div T_1$ and code $PN_2$ by an amount $C_2 \approx -(DR)\Delta T_Y \div T_2$.

2. A method according to claim 1 wherein said drift in said PN code frequencies originates in just $V_B$, and said phase shifting step is performed in just $V_A$.

3. A method according to claim 1 wherein said drift in said PN code frequencies originates in both $V_A$ and $V_B$, and said phase shifting step is performed in just $V_A$.

4. A method according to claim 1 wherein said drift in said PN code frequencies originates in just $V_A$, and said phase shifting step is performed in just $V_A$.

5. A method according to claim 1 wherein each PN code which drifts is generated in response to a clock signal from an oscillator that drifts from a nominal frequency by at least $10^{-8}$ cycles per day.

6. A method according to claim 1 wherein each PN code which drifts is generated in response to a clock signal from a crystal oscillator.

7. A method according to claim 1 wherein said sensing step includes the substeps of sampling in $V_B$ said time varying phases $\phi_{CB}$ and $\phi_{MB}$ at two time instants to obtain four samples; and transmitting said four samples from $V_B$ and $V_A$.

8. A method according to claim 1 wherein said sensing step includes the substeps of determining in $V_B$ said phase changes $\Delta\phi_{CB}$ and $\Delta\phi_{MB}$ over said time interval $\Delta T_X$; and, transmitting said phase changes $\Delta\phi_{CB}$ and $\Delta\phi_{MB}$ from $V_B$ to $V_A$.

9. A method according to claim 1 wherein said sensing step includes the substep of transmitting a command from $V_A$ to $V_B$ which initiates a phase sensing operation in $V_B$.

10. A method according to claim 1 wherein $T_1$ equals $T_2$, and said phase shifting step shifts said code phases $\phi_{MA}$ and $\phi_{CA}$ by $N_1$ bit periods where $N_1$ is the largest integer in $$\frac{C}{T_1}.$$

11. A method according to claim 1 wherein $T_1$ differs from $T_2$, and said phase shifting step shifts said code phases $\phi_{MA}$ and $\phi_{CA}$ by $N_1$ and $N_2$ bit periods respectively where $N_1$ is the largest integer in $$\frac{C}{T_1}$$

and $N_2$ is the largest integer in $$\frac{C}{T_2}.$$

* * * * *